United States Patent
Monge Nunez et al.

(10) Patent No.: US 11,194,401 B2
(45) Date of Patent: Dec. 7, 2021

(54) GESTURE CONTROL OF INTERNET OF THINGS DEVICES

(71) Applicant: International Business Machines Corporation, Armonk, NY (US)

(72) Inventors: Roxana Monge Nunez, Perez Zeledon (CR); Cesar Augusto Rodriguez Bravo, Alajuela (CR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 10 days.

(21) Appl. No.: 16/740,525

(22) Filed: Jan. 13, 2020

(65) Prior Publication Data

US 2021/0216145 A1 Jul. 15, 2021

(51) Int. Cl.
 *G06K 9/00* (2006.01)
 *G06F 3/01* (2006.01)

(52) U.S. Cl.
 CPC .......... *G06F 3/017* (2013.01); *G06K 9/00288* (2013.01); *G06K 9/00335* (2013.01)

(58) Field of Classification Search
 CPC ..... H04N 1/00381; G06F 3/005; G06F 3/017; G06F 3/013; G06K 9/00335; G06K 2009/00395; G06K 9/00355; G06K 9/00288; H05B 47/10
 See application file for complete search history.

(56) References Cited

U.S. PATENT DOCUMENTS

| 7,675,538 B2 | 3/2010 | Thies | |
| 2011/0093820 A1* | 4/2011 | Zhang | A63F 13/77 |
| | | | 715/863 |
| 2013/0191790 A1* | 7/2013 | Kawalkar | G06F 3/04883 |
| | | | 715/863 |

(Continued)

FOREIGN PATENT DOCUMENTS

| CN | 103472796 B | 10/2014 |
| WO | 03049438 A1 | 6/2003 |
| WO | 2017147892 A1 | 9/2017 |

OTHER PUBLICATIONS

Nespoli et al., "PALOT: Profiling and Authenticating Users Leveraging Internet of Things", Sensors 2019, doi:10.3390/s19122832, 26 pages. <http://www.mdpi.com/journal/sensors>.

(Continued)

*Primary Examiner* — Syed Haider
(74) *Attorney, Agent, or Firm* — Erik C Swanson; Andrew D. Wright; Roberts Calderon Safran & Cole, P.C.

(57) ABSTRACT

A set of gesture commands are learned. Each gesture in the set of gesture commands controls a function of one or more computing devices. A first gesture received from a user is identified. A determination is made whether at least one computing device associated with the identified gesture is active. In response to determining that at least one computing device associated with the identified gesture is active, a determination is made whether the user associated with the identified gesture is recognized. In response to determining that the user associated with the identified gesture is recog- (Continued)

nized, an action to perform on at least one computing device associated with the identified gesture is determined. The determined action is implemented.

17 Claims, 3 Drawing Sheets

(56) References Cited

U.S. PATENT DOCUMENTS

2016/0026252 A1\* 1/2016 McCoy ................... G06F 3/017
 345/156
2018/0285062 A1\* 10/2018 Ulaganathan ........... H04L 67/12

OTHER PUBLICATIONS

Kim et al., "Watch & Do: A Smart IoT Interaction System with Object Detection and Gaze Estimation", DOI 10.1109/TCE.2019.2897758, 0098-3063 (c) 2018 IEEE, 10 pages.

\* cited by examiner

GESTURE CONTROL OF INTERNET OF THINGS DEVICES

BACKGROUND

The present invention relates generally to the field of Internet of Things devices, and more particularly to providing gesture control of Internet of Things devices.

The Internet of Things (IoT) is the interconnection via the Internet of computing devices embedded in everyday objects, enabling them to send and receive data. Examples of IoT devices include connected security systems, thermostats, cars, electronic appliances, lights in household and commercial environments, alarm clocks, audio systems, speaker systems, vending machines, voice-controlled devices, and more. IoT devices can be controlled by an application (i.e., an "app") on a smartphone.

SUMMARY OF THE INVENTION

Embodiments of the present invention include an approach for providing gesture control of Internet of Things devices. In one embodiment, a set of gesture commands are learned. Each gesture in the set of gesture commands controls a function of one or more computing devices. A first gesture received from a user is identified. A determination is made whether at least one computing device associated with the identified gesture is active. In response to determining that at least one computing device associated with the identified gesture is active, a determination is made whether the user associated with the identified gesture is recognized. In response to determining that the user associated with the identified gesture is recognized, an action to perform on at least one computing device associated with the identified gesture is determined. The determined action is implemented.

DETAILED DESCRIPTION

Embodiments of the present invention recognize that the number of available Internet of Things (IoT) devices is increasing rapidly. Different types of devices are being introduced to many different purposes—thermostats, kitchen appliances, faucets, security systems, the list goes on and on. Today, the predominant means for controlling IoT devices is by using an application (app) on a smartphone. Sometimes, using an app can be inconvenient—maybe the smartphone has run out of power, maybe the app will not open properly, maybe the person with the smartphone has left the room, etc. An easier way to control the IoT devices is needed.

Embodiments of the present invention recognize that there may be a method, computer program product, and computer system for providing gesture control of Internet of Things devices. In an embodiment, the method, computer program product, and computer system learn unique gestures for controlling specific functions of one or more IoT devices without the aid of an app on a smartphone.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
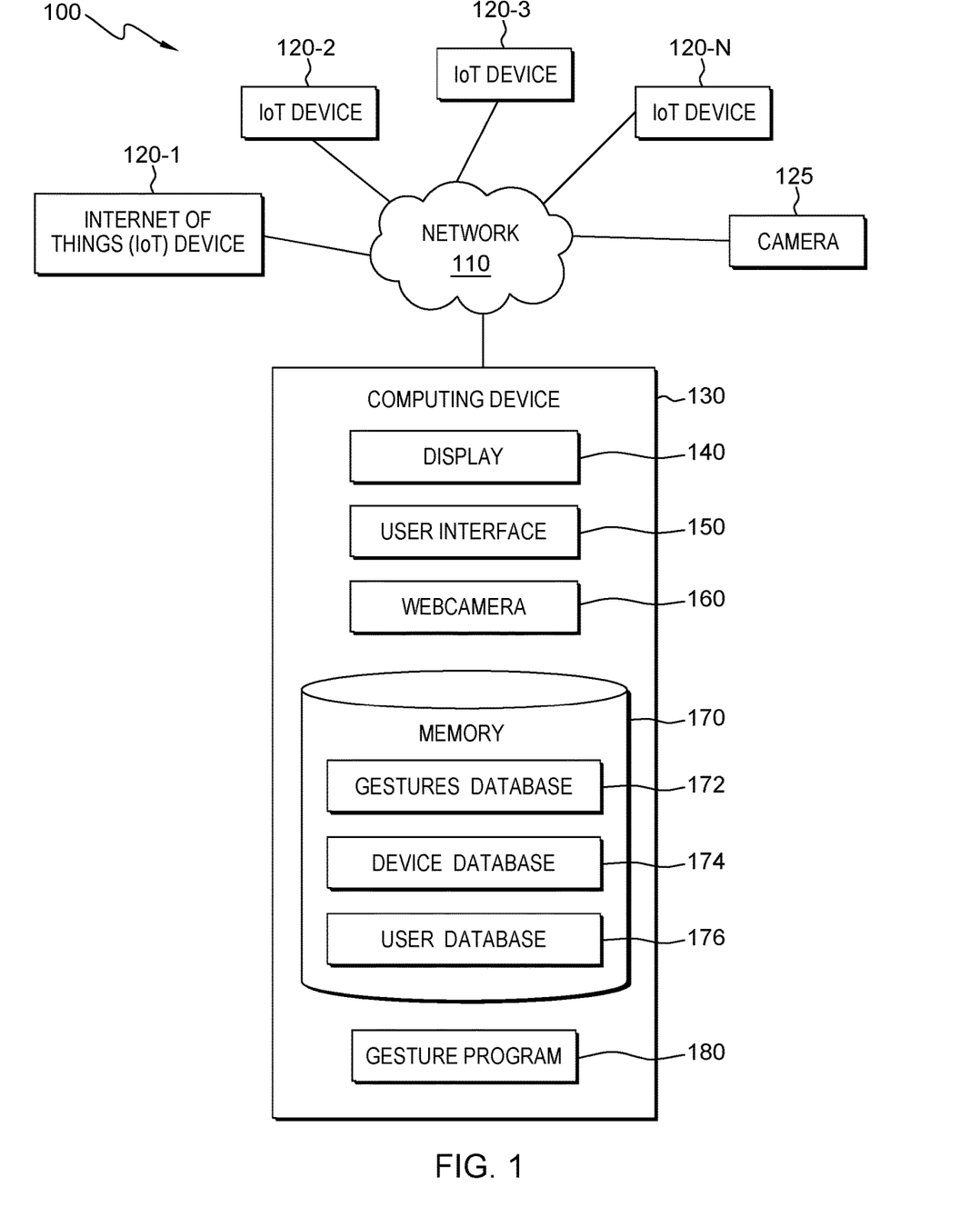
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes Internet of Thing (IoT) device 120-1, IoT device 120-2, IoT device 120-3, IoT device 120-N, camera 125, and computing device 130, interconnected by network 110. In example embodiments, computing environment 100 includes other computing devices (not shown in FIG. 1) such as smartwatches, cell phones, additional smartphones, wearable technology, phablets, tablet computers, additional laptop computers, additional desktop computers, other computer servers or any other computer system known in the art, interconnected with IoT device 120-1, IoT device 120-2, IoT device 120-3, IoT device 120-N, camera 125, and computing device 130 over network 110. For ease of reading, the term IoT device 120-N will be used when discussing features of any of IoT device 120-1, IoT device 120-2, IoT device 120-3, and IoT device 120-N.

In embodiments of the present invention, IoT device 120-N, camera 125, and computing device 130 are connected to network 110, which enables IoT device 120-N, camera 125, and computing device 130 to access other computing devices and/or data not directly stored on IoT device 120-N, camera 125, and computing device 130. Network 110 may be, for example, a short-range, low power wireless connection, a local area network (LAN), a telecommunications network, a wide area network (WAN) such as the Internet, or any combination of the three, and include wired, wireless, or fiber optic connections. In an embodiment, network 110 includes one or more wired and/or wireless networks that are capable of receiving and transmitting data, voice, and/or video signals, including multimedia signals that include voice, data, and video information. In general, network 110 is any combination of connections and protocols that will support communications between IoT device 120-N, camera 125, and computing device 130, and any other computing devices (not shown in FIG. 1) connected to network 110, in accordance with embodiments of the present invention. In an embodiment, data received by another computing device (not shown in FIG. 1) in computing environment 100 is communicated to IoT device 120-N, camera 125, and computing device 130 via network 110.

According to embodiments of the present invention, IoT device 120-N is a computing device in a system of interrelated computing devices that are provided with unique identifiers (UIDs) and the ability to transmit and receive data over a network without requiring human-to-human or human-to-computer interaction. Application uses for IoT device 120-N include, but are not limited to, business, consumer, commercial, industrial, infrastructure, and military applications. In an embodiment, IoT device 120-N is a device used in a business application. In the embodiment, IoT device 120-N can be a lighting control, an audio/video control, a control for window treatments, or any other similar control used in a business setting such as a conference room or office area. According to an embodiment of the present invention, IoT device 120-N may include a camera (not shown in FIG. 1) or any other technology capable of recognizing gestures from a user.

In an embodiment, camera 125 is one or more cameras in computing environment 100 capable of capturing still photographs and video of a plurality of objects within computing environment 100. In the embodiment, the one or more objects include human users (not shown in FIG. 1), any number of IoT device 120-N, and any other animate or inanimate objects within computing environment 100. According to an embodiment of the present invention, camera 125 is capable of recognizing/identifying human users via facial recognition technology that is well known in the art. Further in the embodiment, camera 125 is capable of determining a line of sight of each human user with computing environment 100; based on the determined line of sight, camera 125 can determine what specific object (e.g., IoT device 120-N) the user is looking at within computing environment 100.

In embodiments of the present invention, computing device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, computing device 130 can be a standalone computing device, a management server, a web server, a mobile computing device, or any other electronic device or computing system capable of receiving, transmitting, and processing data. In other embodiments, computing device 130 can represent computing systems utilizing multiple computers as a server system, such as in a cloud computing environment. In certain embodiments, computing device 130 represents a computer system utilizing clustered computers and components (e.g., database server computers, application server computers, etc.) that act as a single pool of seamless resources when accessed by elements of computing environment 100. In general, computing device 130 is representative of any electronic device or combination of electronic devices capable of executing computer readable program instructions. In an embodiment, computing environment 100 includes any number of computing device 130. Computing device 130 may include internal and external hardware components as depicted and described in further detail with respect to FIG. 3, in accordance with embodiments of the present invention. Computing device 130 may also include display 140, user interface (UI) 150, web camera 160, memory 170, and gesture program 180.

According to an embodiment of the present invention, display 140 is an electronic visual device for a desktop computer, laptop computer, tablet computer, smartphone, smart-watch, and the like. Display 140 may include a touchscreen which is an input device layered on top of the display for allowing a user to control an electronic device via simple or multi-touch gestures by touching display 140 with a special stylus and/or one or more fingers. Display 140 displays user interface 150 as well as open programs and applications, allowing a user of computing device 130 to interact with the open programs and applications via a keyboard and mouse (not shown in FIG. 1) or via any other input technologies known in the art. Display 140 may be a thin film transistor liquid crystal display (TFT-LCD), a flat panel LED (light emitting diode) display, or a cathode ray tube (CRT). Display 140 may be connected to computing device 130 via VGA (video graphics array), DVI (digital video interface), HDMI (High Definition Multi-Media Interface or any other connection type known in the art.

In an embodiment, user interface 150 provides an interface between IoT device 120-N, computing device 130, and gesture program 180. User interface 150 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 150 may also be mobile application software that provides an interface between IoT device 120-N, computing device 130, and gesture program 180. Mobile application software, or an "app," is a computer program designed to run on smartphones, tablet computers and other mobile devices. User interface 150 enables a user of computing device 130 to interact with IoT device 120-N, gesture program 180, and any other computing devices not shown in FIG. 1.

According to an embodiment of the present invention, web camera 160 is a video camera that is capable of capturing an image or a video in real time. In an embodiment, the captured image and video may be stored to memory 170 or transmitted, via network 110, to any other computing device in computing environment 100. According to an embodiment, web camera 160 can be used to teach user gestures to IoT device 120-N. According to another embodiment, web camera 160 can be used to take a photograph or a video of the user as a part of the user registration process.

In an embodiment, memory 170 is storage that is written to and/or read by gesture program 180, and any other programs and applications on IoT device 120-N and computing device 130. In one embodiment, memory 170 resides on computing device 130. In other embodiments, memory 170 resides on IoT device 120-N, on any other device (not shown) in computing environment 100, in cloud storage, or on another computing device accessible via network 110. In yet another embodiment, memory 170 represents multiple storage devices within computing device 130. Memory 170 may be implemented using any volatile or non-volatile storage media for storing information, as known in the art. For example, memory 170 may be implemented with a tape library, optical library, one or more independent hard disk drives, multiple hard disk drives in a redundant array of independent disks (RAID), solid-state drives (SSD), or random-access memory (RAM). Similarly, memory 170 may be implemented with any suitable storage architecture known in the art, such as a relational database, an object-oriented database, or one or more tables. In an embodiment of the present invention, gesture program 180 and any other programs and applications (not shown in FIG. 1) operating on computing device 130 may store, read, modify, or write data to memory 170. In an embodiment of the present invention, data stored to memory 170 includes, but is not limited to, data stored to gestures database 172, device database 174, and user database 176.

According to embodiments of the present invention, gestures database 172 is a memory location within memory 170 where gestures, and associated actions to be taken by IoT device 120-N, are stored. In an embodiment, gestures stored to gestures database 172 include, but are not limited to, showing two fingers for an action to turn on lights, showing three fingers for an action to turn off lights, showing four fingers to increase an audio volume, showing five fingers to decrease an audio volume, a waving gesture with the left hand to start playing a video, a waving gesture with the right hand to stop playing the video, a gesture of two simulated hand claps to close the blinds in a room, a gesture of four simulated hand claps to open the blinds in the room, a thumbs up gesture to increase the temperature in the room, a thumbs down gesture to decrease the temperature in the room, etc. In the embodiment, a single gesture implies that one "action" is to be taken (e.g., a single thumbs up will increase the room temperature by one degree) and multiple gestures implies that multiple "actions" are to be taken (e.g., three thumbs up gestures will increase the room temperature by three degrees). According to one embodiment, a specific gesture is specific to only one IoT device 120-N (e.g., a waving gesture with both hands is an indication to only turn off audio/video equipment). According to another embodiment, a specific gesture can be used for multiple IoT device 120-N via appropriate training of each IoT device 120-N (e.g., a waving gesture with both hands is an indication to turn off audio/video equipment and to turn on all of the room lights at full power).

In an embodiment, device database 174 is a memory location within memory 170 where gesture program 180 can store information concerning one or more IoT device 120-N. According to an embodiment of the present invention, data stored to device database 174 includes, but is not limited to, an authorized user who is approved to control IoT device 120-N via one or more gestures, one or more device names (e.g., "light control module" and "audio/video module") to be controlled by the authorized user, one or more learned gestures for the named device(s) (e.g., showing two fingers is a first indication for the "light control module" and showing three fingers is a second indication for the "light control module"), and one or more actions to be taken by IoT device 120-N (e.g., responsive to the first indication, "light control module" turns lights "on" and responsive to the second indication, "light control module" turns lights "off").

In an embodiment, user database 176 is a memory location within memory 170 where gesture program 180 can store information associated with one or more registered users of gesture program 180. According to an embodiment of the present invention, data stored to user database 176 includes, but is not limited to, a name of a user, a photograph or video of the face of the user, and a listing of a plurality of IoT device 120-N the user is authorized to control.

According to an embodiment of the present invention, gesture program 180 can be a program, a subprogram of a larger program, an application, a plurality of applications, or mobile application software, which functions to provide gesture control of Internet of Things devices such as IoT device 120-N. A program is a sequence of instructions written by a programmer to perform a specific task. In an embodiment, gesture program 180 runs by itself. In other embodiments, gesture program 180 depends on system software (not shown in FIG. 1) to execute. In one embodiment, gesture program 180 functions as a stand-alone program residing on computing device 130. In another embodiment, gesture program 180 works in conjunction with other programs, applications, etc., found in computing environment 100. In yet another embodiment, gesture program 180 resides on IoT device 120-N. In yet another embodiment, gesture program 180 resides on other computing devices (not shown in FIG. 1) in computing environment 100, which are interconnected to IoT device 120-N and computing device 130 via network 110.

In an embodiment, gesture program 180 receives a device registration. In the embodiment, gesture program 180 receives a user registration (or authorization). Further in the embodiment, gesture program 180 learns device commands for each IoT device 120-N. Further yet in the embodiment, gesture program 180 identifies a gesture. Responsive to the system being active, gesture program 180 determines whether the user is recognized. Responsive to recognizing the user, gesture program 180 determines an action to take based on the identified gesture and implements the action on the appropriate IoT device 120-N.

Figure 2:
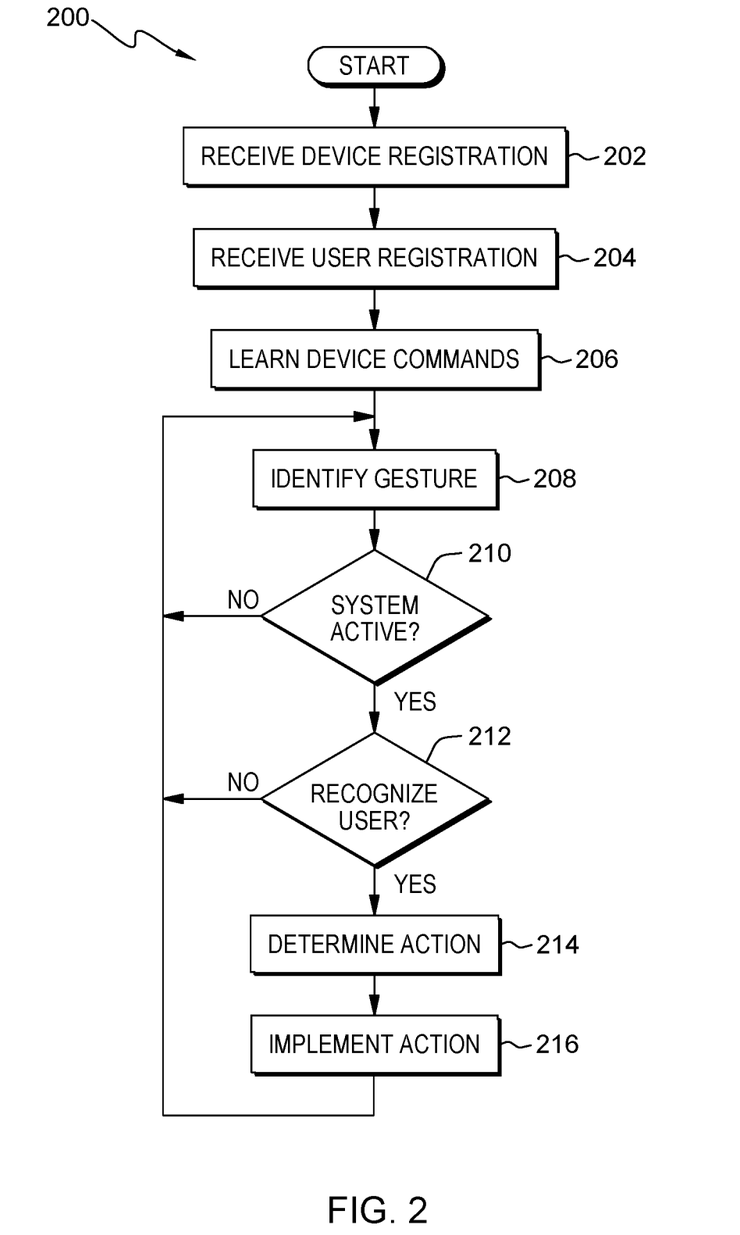
FIG. 2 depicts a flowchart of a program for providing gesture control of Internet of Things devices, in accordance with an embodiment of the present invention.

FIG. 2 is a flowchart of workflow 200 depicting a method for providing gesture control of Internet of Things devices. In one embodiment, the method of workflow 200 is performed by gesture program 180. In an alternative embodiment, the method of workflow 200 is performed by any other program working with gesture program 180. In an embodiment, a user, via user interface 150, invokes workflow 200 upon registering an IoT device. In an alternative embodiment, a user invokes workflow 200 upon accessing gesture program 180 on computing device 130 via network 110.

In an embodiment, gesture program 180 receives device registration (step 202). In other words, gesture program 180 receives registration information for one or more IoT device 120-N. According to an embodiment, the registration information includes, but is not limited to, one or more IoT device 120-N, names for each of the one or more IoT device 120-N, and an authorized user who is approved to control each of the one or more IoT device 120-N. In an embodiment, gesture program 180 receives the device registration information from a user of computing device 130. In another embodiment, gesture program 180 receives device registration information directly from IoT device 120-N. According to an embodiment, gesture program 180 stores the device registration information to device database 174 in memory 170 on computing device 130. In an embodiment of the present invention, gesture program 180 receives device registration information for two IoT device 120-N from a user of computing device 130. For example, Ann provides device registration information for two IoT devices to a program on a laptop computer. In the example, the two IoT devices are a light control device (named "LC") for the room lights and a volume control device (named "VC") for an audio system.

According to an embodiment of the present invention, gesture program 180 receives user registration (step 204). In other words, gesture program 180 receives the registration information for the user (or users) that will control IoT device 120-N via gestures. In an embodiment, the registration information includes, but is not limited to, a user name and a picture (or video) of the user. In the embodiment, the picture (or video) of the user is required so that facial recognition software included in IoT device 120-N (or in a camera connected to computing device 130 via network 110 (not shown in FIG. 1) can recognize the user and determine whether the user is registered (i.e., authorized to control IoT device 120-N). Further in the embodiment, gesture program 180 stores the registration information associated with the user to user database. Further yet in the embodiment, any user who is registered is provided the option, by gesture program 180, to opt in or opt out (i.e., provide consent or decline registration) of controlling IoT device 120-N. According to an embodiment, gesture program 180 receives registration information for a user who is authorized to control IoT device 120-N via web camera 160; gesture program 180 stores the received registration information for the user to user database 176 in memory 170 on computing device 130. For example, Ann provides registration information to the program on the laptop via a camera on the laptop by taking a photo of herself using the webcam included on the laptop and Ann stores the photo along with her name and the names "LC" and "VC" (the two IoT devices Ann is authorized to control) to a memory on the laptop.

In an embodiment, gesture program 180 learns device commands (step 206). In other words, gesture program 180 learns a plurality of user gestures that will control various functions of IoT device 120-N. According to an embodiment of the invention, gesture program 180 learns the device commands by receiving a command file of gestures from a user; the command file of gestures includes one or more gestures and one or more associated actions to be performed on IoT device 120-N based on the gestures. According to another embodiment, gesture program 180 learns the device commands by "watching", via a camera such as camera 125, a user demonstrate an example gesture followed by the user taking an action on one or more IoT device 120-N; gesture program 180 then associates the example gesture with the action taken on the one or more IoT device 120-N. According to yet another embodiment, gesture program 180 learns the device commands by receiving input from the user, via web camera 160, of a demonstrated gesture. In the embodiment, the user assigns the demonstrated gesture to an action to be taken on at least one IoT device 120-N thus associating the demonstrated gesture with the action. According to an embodiment of the present invention, the learned device commands are stored by gesture program 180 to gestures database 172 in memory 170 on computing device 130. In an embodiment, gesture program 180 learns the device commands for IoT device 120-N by "watching" a user demonstrate gestures and associated actions via a camera incorporated into IoT device 120-N (not shown in FIG. 1). For example, Ann performs the following demonstrations which are captured by a camera monitoring the room: (i) Ann shows two fingers on her right hand and then turns on the room lights, this gesture controls "LC"; (ii) Ann shows three fingers in her right hand and then turns off the room lights, this gesture controls "LC"; (iii) Ann shows four fingers on her right hand and then increases the audio volume by one level, this gesture controls "VC"; and (iv) Ann shows five fingers on her right hand and then decreases the audio volume by one level, this gesture controls "VC".

According to an embodiment of the present invention, gesture program 180 identifies a gesture (step 208). In other words, gesture program 180 identifies a gesture made by a user attempting to control IoT device 120-N. In an embodiment, gesture program 180 identifies the gesture by comparing the current gesture by the user to the plurality of gestures stored to gestures database 172. In another embodiment, gesture program 180 identifies the gesture by comparing the current gesture to the gestures provided in the received command file of gestures. In yet another embodiment, gesture program 180 uses information from camera 125 (e.g., camera 125 can determine what IoT device 120-N a user is looking at based on determining the line of sight of the user) to aid in identifying a gesture. For example, if gesture program 180 is unable to differentiate between the three finger gesture and the four finger gesture by a user and camera 125 determines that the user is looking at a volume control IoT device, gesture program 180 determines that the gesture is four fingers since the four finger gesture is associated with "volume" while the three finger gesture is associated with "lighting". According to an embodiment, if gesture program 180 cannot identify the current gesture, gesture program 180 takes no action. According to another embodiment, if gesture program 180 cannot identify the current gesture, gesture program 180, based on context, predicts the gesture. For example, if gesture program 180 identifies a first gesture to control audio volume, gesture program 180 may predict that a second gesture is meant to control room lighting. In the example, gesture program 180 may blink the room lights once to confirm its prediction. If the user confirms the prediction (based on a confirmation gesture), gesture program 180 then performs the action to the room lights based on the predicted gesture. According to the embodiment, if gesture program 180 is able to identify the current gesture, gesture program 180 will determine if the system is active. In an embodiment, gesture program 180 identifies a current gesture made by a user as observed by a camera included on IoT device 120-N (not shown in FIG. 1) by comparing the current gesture to a plurality of gestures stored to gestures database 173 in memory 170 on computing device 130. For example, a program on the laptop used by Ann attempts to identify a gesture made by Ann in which Ann shows two fingers on her right hand. The program searches a database of gestures that is stored to memory on the laptop and identifies a gesture of two fingers stored to memory on the laptop.

In an embodiment, gesture program 180 determines whether the system is active (decision step 210). In other words, responsive to identifying a gesture, gesture program 180 whether the system (i.e., the IoT device) associated with the identified gesture is active (i.e., powered on and ready to receive gesture commands). According to one embodiment (decision step 210, NO branch), gesture program 180 determines that the system is not active; therefore, gesture program 180 returns to step 208 to identify a new gesture. According to the embodiment (decision step 210, YES branch), gesture program 180 determines that the system is active; therefore, gesture program 180 proceeds to the next step.

According to an embodiment of the present invention, gesture program 180 determines whether the user is recognized (decision step 212). In other words, responsive to determining that the system is active, gesture program 180 determines whether the user associated with the identified gesture is recognized. In an embodiment, gesture program 180 uses facial recognition to compare the user associated with the identified gesture to information stored to user database 176; if gesture program 180 determines a match via the comparison, gesture program 180 determines that the user is recognized and further, is authorized to control IoT device 120-N. In one embodiment (decision step 212, NO branch), gesture program 180 determines that the user is not recognized; therefore, gesture program 180 returns to step 208 to identify a new gesture. In the embodiment (decision step 212, YES branch), gesture program 180 determines that the user is recognized; therefore, gesture program 180 proceeds to step 214 to determine an action.

In an embodiment, gesture program 180 determines action (step 214). In other words, responsive to determining that the user is recognized as a registered/authorized user, gesture program 180 determines one or more actions associated with the identified gesture to be taken on IoT device 120-N. According to an embodiment of the present invention, gesture program 180 compares the identified gesture to the plurality of gestures stored to gestures database 172 to determine the one or more actions to perform. Further in the embodiment, when a match is found between the identified gesture and a gesture stored to gestures database 172, gesture program 180 determines the one or more actions to perform on IoT device 120-N that are associated with the matched gesture stored to gestures database 172. In an embodiment, gesture program 180 determines one or more actions to take on IoT device 120-N by matching the identified gesture to a gesture stored to gestures database 172 in memory 170 on computing device 130. For example, the identified gesture made by Ann (showing two fingers on her right hand) is a gesture stored to memory on the laptop; the gesture is an indication to control "LC", the lighting control IoT device.

According to an embodiment of the present invention, gesture program 180 implements one or more actions (step 216). In other words, gesture program 180 implements (i.e., performs) the determined action on IoT device 120-N. In an embodiment, gesture program 180 transmits one or more instructions to IoT device 120-N so that the determined action is implemented. According to an embodiment, gesture program 180 transmits one or more instructions via network 110 to IoT device 120-N so that the determined action is implemented by IoT device 120-N. For example, based on the identified gesture made by Ann and the action associated with the gesture, an instruction is transmitted to "LC"; in response, the IoT device "LC" turns on the room lights.

Figure 3:
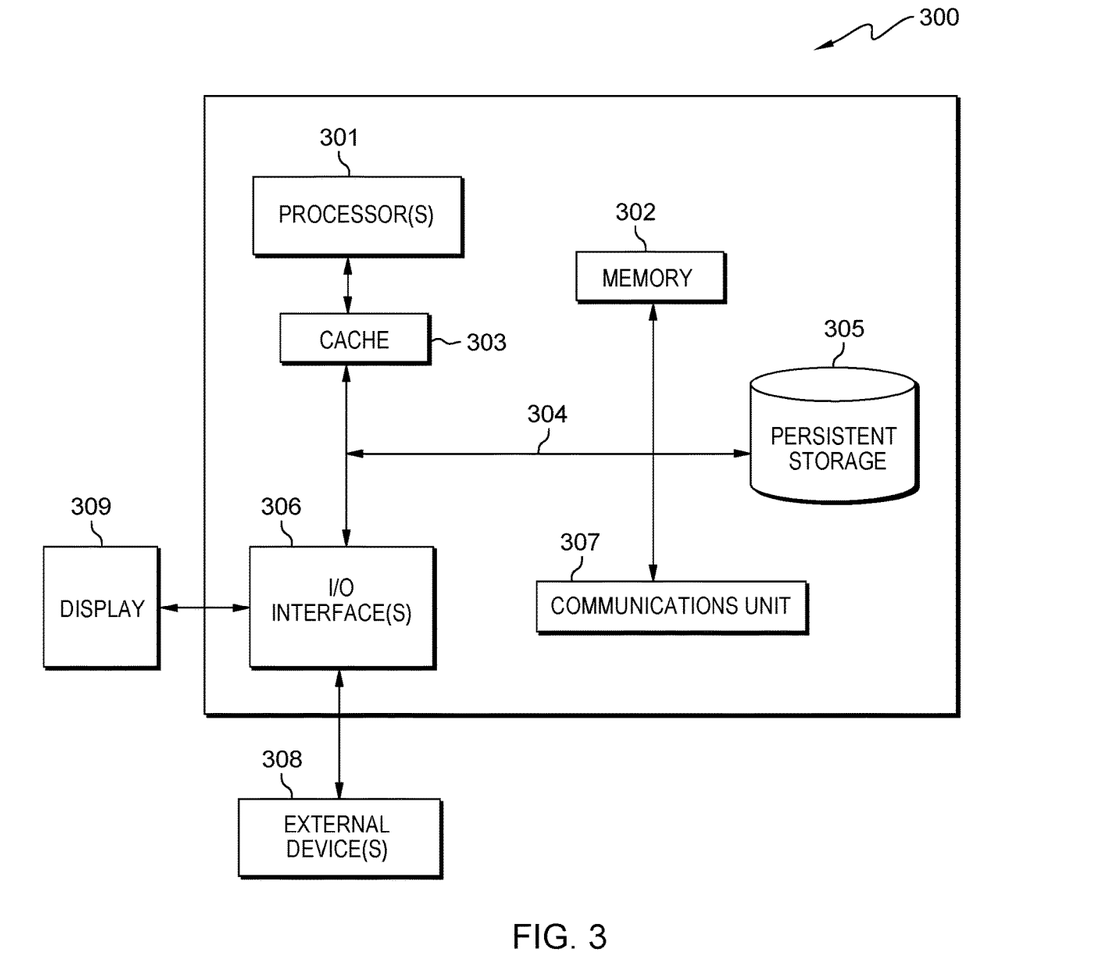
FIG. 3 depicts a block diagram of components of the computing environment of FIG. 1, in accordance with an embodiment of the present invention.

FIG. 3 depicts computer system 300, which is an example of a system that includes gesture program 180. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
   learning, by one or more computer processors, a set of gesture commands, wherein each gesture in the set of gesture commands controls a function of one or more computing devices;
   identifying, by one or more computer processors, a first gesture in the set of gesture commands received from a user;
   determining, by one or more computer processors, whether at least one computing device associated with the identified first gesture is active;
   responsive to determining that at least one computing device associated with the identified first gesture is active, determining, by one or more computer processors, whether the user associated with the identified first gesture is recognized;
   responsive to determining that the user associated with the identified first gesture is recognized, determining, by one or more computer processors, an action to perform on at least one computing device of the one or more computing devices associated with the identified first gesture; and
   implementing, by one or more computer processors, the determined action to perform on the at least one computing device associated with the identified first gesture,
   wherein the step of identifying, by one or more computer processors, a first gesture in the set of gesture commands received from a user, comprises:

comparing, by one or more computer processors, the first gesture to a plurality of gestures stored to a database;
responsive to not identifying the first gesture based on the comparison to the plurality of gestures stored to the database, comparing, by one or more computer processors, the first gesture to a command file of gestures received from the user;
responsive to not identifying the first gesture based on the comparison to the command file of gestures received from the user, identifying, by one or more computer processors, a line of sight of the user to determine what computing device the user is looking at to aid in identifying the first gesture; and
responsive to not identifying the first gesture based on the determined line of sight, predicting, by one or more computer processors, the first gesture based on a current context.

2. The method of claim 1, further comprising:
responsive to determining that at least one computing device associated with the identified first gesture is not active, identifying, by one or more computer processors, a second gesture in the set of gesture commands received from the user.

3. The method of claim 1, further comprising:
responsive to determining that the user associated with the identified first gesture is not recognized, identifying, by one or more computer processors, a third gesture in the set of gesture commands received from a user.

4. The method of claim 1, wherein the step of learning, by one or more computer processors, a set of gesture commands, comprises at least one of receiving a command file of gestures and associated actions from the user; and receiving a first example gesture, demonstrated by the user, via a web camera and receiving an association between the first example gesture and one or more actions to take on one or more computing devices.

5. The method of claim 1, wherein the step of determining, by one or more computer processors, whether the user associated with the identified first gesture is recognized, comprises:
comparing, by one or more computer processors, a face of the user associated with the identified first gesture to a plurality of user information stored to a user database.

6. The method of claim 5, wherein:
the plurality of information stored to the user database includes one or more photographs of one or more registered user in a plurality of registered users; and
the comparison of the face of the user associated with the identified first gesture to the one or more photographs of the one or more registered users in the plurality of registered users utilizes facial recognition technology.

7. A computer program product, the computer program product comprising:
one or more computer readable storage media; and
program instructions stored on the one or more computer readable storage media, the program instructions comprising:
program instructions to learn a set of gesture commands, wherein each gesture in the set of gesture commands controls a function of one or more computing devices;
program instructions to identify a first gesture in the set of gesture commands received from a user;
program instructions to determine whether at least one computing device associated with the identified first gesture is active;
responsive to determining that at least one computing device associated with the identified first gesture is active, program instructions to determine whether the user associated with the identified first gesture is recognized;
responsive to determining that the user associated with the identified first gesture is recognized, program instructions to determine an action to perform on at least one computing device of the one or more computing devices associated with the identified first gesture; and
program instructions to implement, the determined action to perform on the at least one computing device associated with the identified first gesture,
wherein the program instructions to identify a first gesture in the set of gesture commands received from a user, comprises:
program instructions to compare the first gesture to a plurality of gestures stored to a database;
responsive to not identifying the first gesture based on the comparison to the plurality of gestures stored to the database, program instructions to compare the first gesture to a command file of gestures received from the user;
responsive to not identifying the first gesture based on the comparison to the command file of gestures received from the user, program instructions to identify a line of sight of the user to determine what computing device the user is looking at to aid in identifying the first gesture; and
responsive to not identifying the first gesture based on the determined line of sight, program instructions to predict the first gesture based on a current context.

8. The computer program product of claim 7, further comprising program instructions stored on the one or more computer readable storage media, to:
responsive to determining that at least one computing device associated with the identified first gesture is not active, identify a second gesture in the set of gesture commands received from the user.

9. The computer program product of claim 7, further comprising program instructions stored on the one or more computer readable storage media, to:
responsive to determining that the user associated with the identified first gesture is not recognized, identify a third gesture in the set of gesture commands received from a user.

10. The computer program product of claim 7, wherein the program instructions to learn a set of gesture commands comprises at least one of program instructions to receive a command file of gestures and associated actions from the user; and program instructions to receive a first example gesture, demonstrated by the user, via a web camera and program instructions to receive an association between the first example gesture and one or more actions to take on one or more computing devices.

11. The computer program product of claim 7, wherein the program instructions to determine whether the user associated with the identified first gesture is recognized, comprises:
program instructions to compare a face of the user associated with the identified first gesture to a plurality of user information stored to a user database.

12. The computer program product of claim 11, wherein:
the plurality of information stored to the user database includes one or more photographs of one or more registered user in a plurality of registered users; and the comparison of the face of the user associated with the identified first gesture to the one or more photographs of the one or more registered users in the plurality of registered users utilizes facial recognition technology.

13. A computer system, the computer system comprising:
one or more computer processors;
one or more computer readable storage media; and
program instructions stored on the one or more computer readable storage media for execution by at least one of the one or more computer processors, the program instructions comprising:
  program instructions to learn a set of gesture commands, wherein each gesture in the set of gesture commands controls a function of one or more computing devices;
  program instructions to identify a first gesture in the set of gesture commands received from a user;
  program instructions to determine whether at least one computing device associated with the identified first gesture is active;
  responsive to determining that at least one computing device associated with the identified first gesture is active, program instructions to determine whether the user associated with the identified first gesture is recognized;
  responsive to determining that the user associated with the identified first gesture is recognized, program instructions to determine an action to perform on at least one computing device of the one or more computing devices associated with the identified first gesture; and
  program instructions to implement, the determined action to perform on the at least one computing device associated with the identified first gesture,
wherein the program instructions to identify a first gesture in the set of gesture commands received from a user, comprises:
  program instructions to compare the first gesture to a plurality of gestures stored to a database;
  responsive to not identifying the first gesture based on the comparison to the plurality of gestures stored to the database, program instructions to compare the first gesture to a command file of gestures received from the user;
  responsive to not identifying the first gesture based on the comparison to the command file of gestures received from the user, program instructions to identify a line of sight of the user to determine what computing device the user is looking at to aid in identifying the first gesture; and
  responsive to not identifying the first gesture based on the determined line of sight, program instructions to predict the first gesture based on a current context.

14. The computer system of claim 13, further comprising program instructions stored on the one or more computer readable storage media for execution by at least one of the one or more computer processors, to:
  responsive to determining that at least one computing device associated with the identified first gesture is not active, identify a second gesture in the set of gesture commands received from the user.

15. The computer system of claim 13, further comprising program instructions stored on the one or more computer readable storage media for execution by at least one of the one or more computer processors, to:
  responsive to determining that the user associated with the identified first gesture is not recognized, identify a third gesture in the set of gesture commands received from a user.

16. The computer system of claim 13, wherein the program instructions to learn a set of gesture commands comprises at least one of program instructions to receive a command file of gestures and associated actions from the user; and program instructions to receive a first example gesture, demonstrated by the user, via a web camera and program instructions to receive an association between the first example gesture and one or more actions to take on one or more computing devices.

17. The computer system of claim 13, wherein the program instructions to determine whether the user associated with the identified first gesture is recognized, comprises:
  program instructions to compare a face of the user associated with the identified first gesture to a plurality of user information stored to a user database.

* * * * *